United States Statutory Invention Registration [19]

[11] Reg. Number: H635

Johnson et al. [43] Published: Jun. 6, 1989

[54] INJECTION MANDREL

[76] Inventors: Dale V. Johnson, 6312 Schouest, Metairie, La. 70003; John R. Gordon, 2513 Eton St., New Orleans, La. 70114

[21] Appl. No.: 35,950

[22] Filed: Apr. 3, 1987

[51] Int. Cl.[4] ..... E21B 43/00

[52] U.S. Cl. ..... 166/310

[58] Field of Search ..... 166/305.1, 117, 117.5, 166/117.6, 162, 268, 304, 305, 310, 311, 312, 902

[56] References Cited

U.S. PATENT DOCUMENTS

| | | | |
|---|---|---|---|
| 2,293,442 | 8/1942 | Montgomery | 166/310 |
| 3,020,958 | 2/1962 | Kenneday | 166/312 |
| 3,104,715 | 9/1963 | Robinson et al. | 166/162 |
| 3,104,716 | 9/1963 | Burkhardt et al. | 166/165 |
| 3,548,946 | 12/1970 | Engle | 166/310 |
| 3,807,498 | 4/1974 | Terral | 166/117.5 |
| 4,031,955 | 6/1977 | Ledet | 166/117.5 |
| 4,042,033 | 8/1977 | Holland et al. | 166/310 |
| 4,066,128 | 1/1978 | Davis et al. | 166/117.5 |
| 4,135,576 | 1/1979 | Tausch | 166/117.5 |
| 4,360,064 | 11/1982 | O'Conner et al. | 166/319 |
| 4,462,465 | 7/1984 | Strickland | 166/117.5 |
| 4,589,482 | 5/1986 | Bayh, III | 166/117.5 |
| 4,646,828 | 3/1987 | Schwab, Jr. et al. | 166/117.5 |

FOREIGN PATENT DOCUMENTS

| | | | |
|---|---|---|---|
| 1190142 | 7/1985 | Canada | 166/304 |

OTHER PUBLICATIONS

McMurray illustration of Center Pocket Mandrels.

Teledyne Merla, Sidepocket Mandrels, 1980, "Composite Catalog," p. 6833.

*Primary Examiner*—Deborah L. Kyle

*Assistant Examiner*—Michael J. Carone

*Attorney, Agent, or Firm*—Herbert E. O'Niell

[57] ABSTRACT

An injection mandrel and method for introducing treating fluids into a well comprise a center pocket mandrel having a check valve in fluid communication with treating fluid in the annulus of the well and with a chemical injection valve in the mandrel. Treating fluid is pumped through the check valve and the chemical injection valve into the produced fluids in the mandrel, while reverse flow is prevented. In another embodiment a dip tube communicating with the injection valve pocket places treating fluid at a preselected location in the well.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INJECTION MANDREL

BACKGROUND OF THE INVENTION

The invention relates generally to subsurface well treating apparatus and operations. In particular, the invention relates to an injection mandrel and method for circulating well treating fluids into subsurface wells to treat produced fluids from subsurface earth formations.

In order to complete oil and gas wells, subsurface earth formations are perforated to bring the wells into production. The fluids produced may subject the subsurface and surface equipment to corrosion from a variety of chemical agents present in the fluids. To combat this corrosion, a number of well-known corrosion inhibitors may be circulated through the wellbore to reduce or prevent the undesirable effects of the corrosive agents.

Produced fluids also may contain salts and other dissolved and undissolved solids which can precipitate and deposit on the surface of the production tubing or in the perforations in the subsurface earth formation. As deposits build, production flow becomes restricted. To combat this problem, one or more of a number of well-known solvents may be circulated through the well to dissolve any flow restricting deposits and to prevent deposits from recurring.

Apparatus and methods are known to circulate such treating fluids through wells at various depths in the wells. Side-pocket mandrels may be utilized for this purpose. A treating fluid is injected into the annulus of a well above a packer assembly, through ports in the side-pocket of the mandrel, through a chemical injection valve set in the side-pocket, and into contact with the produced fluids flowing out of the well. Once the fluids have been treated, they flow through the mandrel and production tubing to the surface for recovery.

Side-pocket mandrels suffer from several shortcomings when used for the above purpose. First, side-pocket mandrels require complicated kickover tools to set and retrieve chemical injection valves in their side valve pocket. Current kickover tools require involved wireline operations which are typically not practical at depths below about 15,000 feet. Second, the construction of a side-pocket mandrel does not permit circulation of the treating fluid below the packer assembly because the mandrel does not extend below the packer. Third, side-pocket mandrels allow untreated, often corrosive, produced fluids into the upper annulus of the well above the packer assembly when the chemical injection valve is not in place. In the annulus, such produced fluids could damage the tubing, casing and other equipment, such as a subsurface safety valve.

Other designs have also been proposed, but these designs suffer from the same or other shortcomings. The other shortcomings include limitations on the ability to circulate treating fluids at any desired depth in a well, limitations on conducting perforating, logging or other operations without having to pull the mandrel from the well, and limitations on flow through the mandrel, which may cause pressure losses and erosion problems.

Ideally, an apparatus for treating produced fluids in a wellbore will have the following characteristics. The annulus, the space between the production tubing and the casing, above the packer should be effectively isolated from produced fluids. The apparatus should be capable of circulating treating fluids across the perforations or at any other preselected depth. The apparatus should be capable of being routinely set and operated at total depths in excess of 15,0090 ft. There should be a capability for conducting workover operations through the apparatus. Restrictions to flow should be minimized.

SUMMARY OF THE INVENTION

The present invention is a mandrel and method for circulating a treating fluid in a well. Preferably, the mandrel is a center-pocket mandrel.

The injection mandrel preferably comprises a body having a longitudinal flow conduit therethrough, a valve pocket in the body substantially axially aligned with the bore of the well and the production tubing and adapted to receive a removable chemical injection valve, a check valve mounted on the body, and a conduit for permitting fluid communication between the check valve and the chemical injection valve. The body is adapted to be attached to a production tubing string. It may be put in the well through and engaging a packer assembly.

With a chemical injection valve set in the valve pocket, treating fluid is injected into the annulus of the well above the packer assembly. This treating fluid flows from the annulus, through the check valve into the valve pocket, through the chemical injection valve and into contact with the formation fluid from the lower interval of the well. The treated formation fluid flows upwardly through the mandrel and the tubing string to the surface for recovery. The check valve prevents formation fluids from entering the annulus.

The chemical injection valve may be removed using standard wireline tools and workover operations can be conducted through the valve pocket, since it is substantially aligned with the well tubing bore.

In order to inject treating fluids at any preselected depth below the mandrel, a dip tube may be connected to the lower end of the injection valve housing. Treating fluids from the annulus may then be pumped through the dip tube to the desired depth for injection into the formation fluids.

The present invention allows chemical injection valves to be routinely set and retrieved at depths much greater than 15,000 feet and precludes entry of the untreated producing fluids into the upper annulus above the packer assembly. Treating fluids may be circulated in the well at any desired depth, and allows a variety of workover and logging tools to be run through the apparatus when the chemical injection valve is removed, so that other downhole operations may be conducted without removing the tubing from the well.

These and other features and advantages of the present invention will be more readily understood by those skilled in the art from a reading of the following detailed description with reference to the accompanying drawings.

BRIEF DESCRIPTION OF THE DRAWINGS

FIGS. 4, 4A and 4B are detailed longitudinal sections of a second embodiment of an injection mandrel in accordance with the present invention.

DETAILED DESCRIPTION

Figure 1:
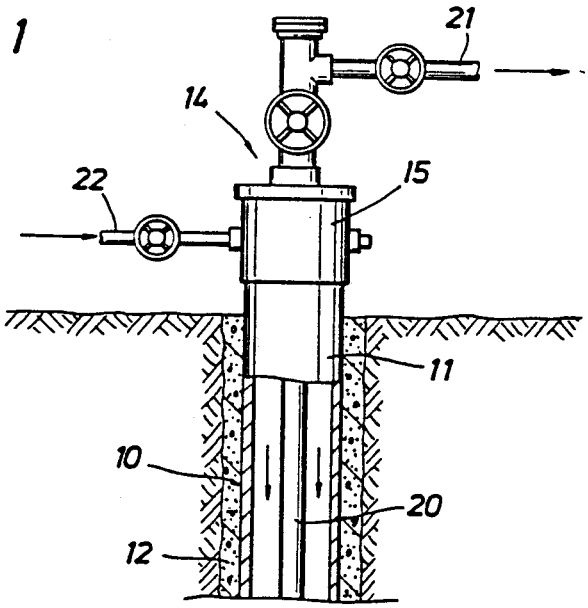
FIGS. 1, 1A and 1B are schematic elevational views of a first embodiment of an injection mandrel in accordance with the present invention.
Figure 1A:
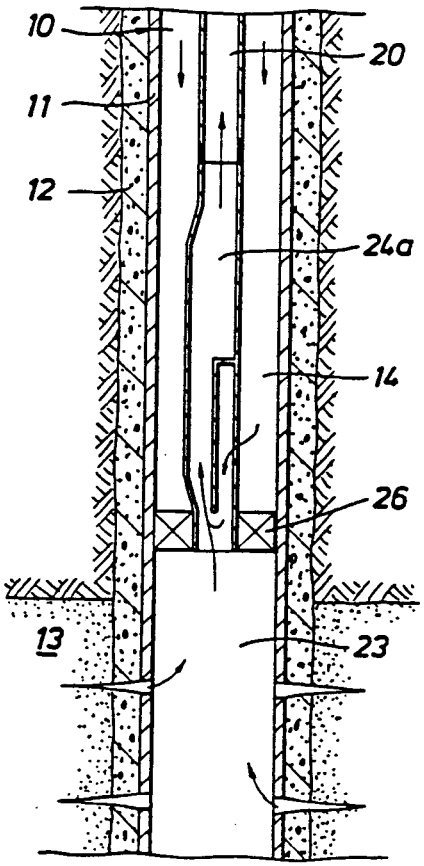
Figure 1B:
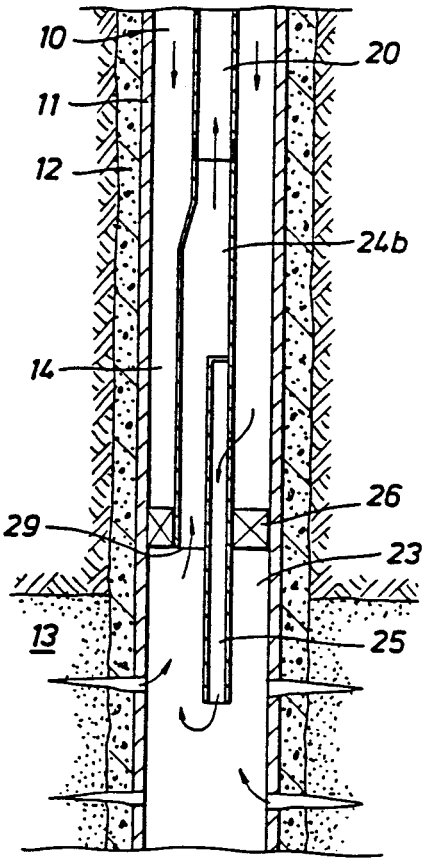

Referring now to the drawings in more detail, Particularly to FIGS. 1, 1A and 1B, there is illustrated a schematic elevational view of an injection mandrel in accordance with the present invention. Preferably, the mandrel is a center pocket mandrel. A well 10 is shown in which a casing 11 has been cemented, indicated at 12, and perforated in a producing zone 13. At the surface a Christmas tree 14 is mounted on a wellhead 15 on top of the casing 11. A tubing string 20 is suspended from the wellhead 15. A valved conduit 21 is connected to the upper end of the tubing string 20 and a second valved conduit 22 is connectqd into the wellhead 15 to communicate with the annulus between the inside of the casing and the outside of the tubing string. A center pocket mandrel, 24*a* in FIG. 1A and 24*b* in FIG. 1B, is connected to the tubing string 20. A packer assembly 26 seals off and divides the well 10 into an annulus 14 between the casing 11 and the tubing string 20 (and between the casing 11 and center pocket mandrels 24*a* and 24*b*) and a lower interval 23 below the packer assembly 26.

Fluids from the producing zone 13 may contain corrosive agents such as hydrogen sulfide, carbon dioxide or water which can damage the casing string 11, tubing 20 and other subsurface and surface equipment. To combat this corrosion problem, a suitable corrosion inhibitor may be injected into the well. Suitable corrosion inhibitors are well known in the art.

The fluids from the producing zone 13 may also contain salts or other dissolved and undissolved solids which can precipitate and deposit in the perforations or tubing string 20, reducing production. To combat this problem, a suitable solvent may be injected into the well to dissolve the deposits. Such solvents are also well known in the art.

As illustrated in FIGS. 1A and 1B, the center pocket mandrels 24*a* and 24*b* are provided for these and for other operations in which it is desired to circulate a treating fluid from the annulus 14 of the well 10 into contact with the formation fluid in the lower interval 23. The present invention is, therefore, not limited in scope solely to the use of corrosion inhibitors or solvents.

Referring to FIGS. 1 and 1A, a suitable treating fluid is pumped through the valved conduit 22 and injected into the annulus 14. From the annulus 14, the treating fluid enters the center pocket mandrel 24*a* through a check valve, described hereinafter, flows into the valve pocket in the valve housing of the center pocket mandrel 24*a* and into the bore of the mandrel to contact the formation fluids from lower interval 23. The treated formation fluid is circulated upward through the flow conduit 25 and to the tubing string 20 and the surface for recovery through the valved conduit 21.

If it is desired to treat formation fluids at a depth below the packer assembly 26, for example at the depth of producing zone 13, the modified center pocket mandrel 24*b* of FIG. 1B may be utilized. The flow of treating fluid is the same as described above, with the following exception. A dip tube 25 is connected to the valve pocket. The dip tube extends below the mandrel into the producing zone 13.

Specific embodiments of injection mandrels in accordance with the present invention are shown in greater detail in FIGS. 2–7. It should be noted that the embodiments comprise many common elements, some identical in construction and others similar but modified for the specific embodiment. The identical elements of the various specific embodiments have common numbering throughout this detailed discussion. The similar but non-identical elements will also have common numbering including a letter identifier for the particular embodiment.

Figure 2:
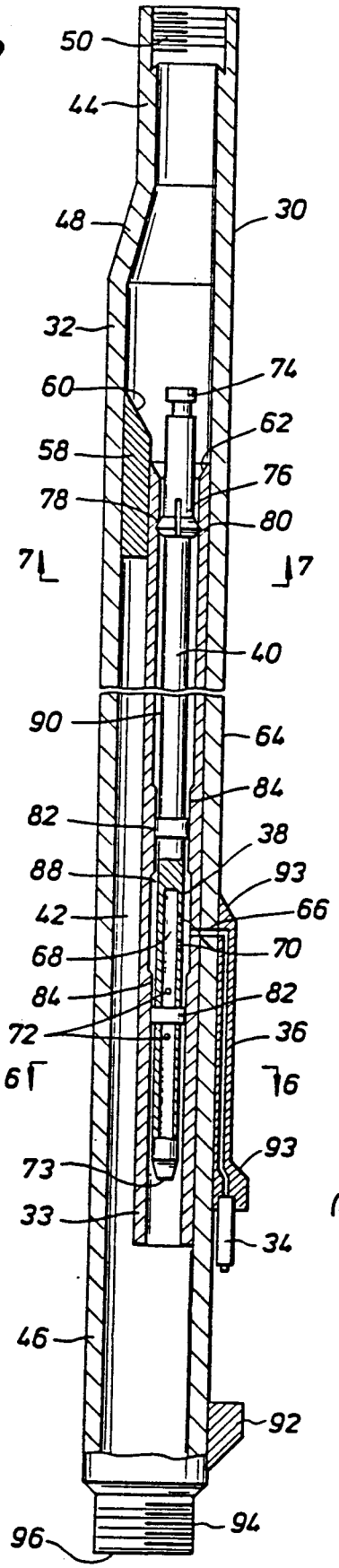
FIG. 2 is a longitudinal section of the first embodiment of the injection mandrel in accordance with the present invention.

Referring to FIG. 2, there is illustrated in detail a center pocket mandrel in accordance with the invention and corresponding to the embodiment depicted in FIG. 1A. The center pocket mandrel 30 comprises a tubular body 32, an exterior check valve 34, a conduit 36 for fluid communication between the check valve 34 and a valve housing 33 defining a valve pocket 38 in the body 32. A removable chemical injection valve 40 is set in the valve pocket 38 for permitting fluid communication from the valve pocket 38 into the formation fluid. The lower end of the chemical injection valve is preferably recessed in, or enclosed by, the valve housing to create a dead space to thereby reduce wear and corrosion of the injection valve by the produced fluids flowing upwardly through the mandrel. A longitudinal flow conduit 42 through the mandrel body 32 transmits treated formation fluid through the mandrel 30 and tubing string 20 FIG. 1A) for collection at the surface. The flow conduit 42 is defined by the inner surface of the body 32 and the outer surface of the valve housing 33 that is attached to the inner surface of the mandrel body 32.

The body 32 has threaded ends 44, 94 for connection to the tubing string 20, a lower section 46 for the chemical injection valve 40, and a tapered upper section 48 between the lower section 46 of the body and the upper threaded end 44. The tapered upper section of the body reduces turbulence in the produced fluid flow to minimize wear on the mandrel at this point.

A mounting lug 58 having a slanted upper surface 60 is connected to the inside surface of the body 32 and the exterior of the valve housing 33, with the slanted upper surface 60 above the top of the valve housing 33. The lug 58 provides additional support for the valve housing 33 and the slanted upper surface 60 directs chemical injection valves 40 (or downhole tools) into or through the valve pocket 38. The valve housing 33 has an inwardly beveled upper edge 62 for the same purpose.

Figure 7:
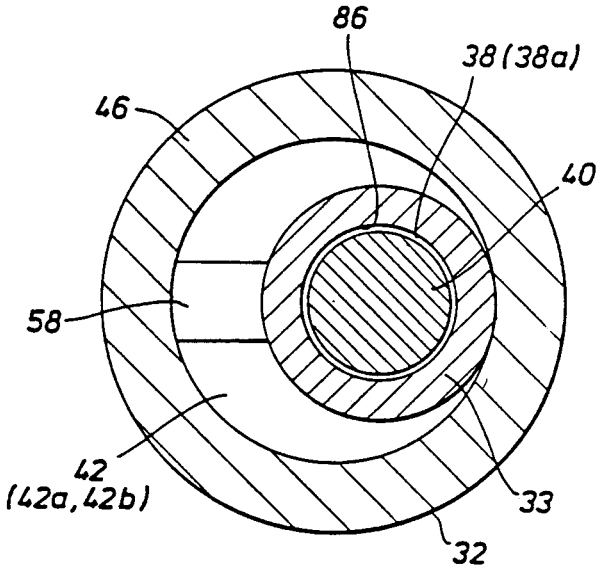
FIG. 7 is a horizontal sectional view of the first embodiment of the injection mandrel taken along line 7—7 of FIG. 2.

The treating fluid conduit 36 is mounted to the exterior wall of the lower body section 46. The conduit 36 comprises a flow passage from the check valve 34,.through a fluid port 66 through the mandrel body, and into the valve pocket 38. Referring to FIGS. 2 and 7, it can be seen that the conduit 36 may comprise a tube welded or otherwise mounted to the exterior wall of the lower body section 46 on the side adjacent the valve housing 33.

The check valve 34 allows fluid to flow from the annulus 14 of the well 10 through the conduit 36 and into the valve pocket 38, but precludes fluid flow in the opposite direction. The check valve 34 may be any of the well known one-way or check valves commonly used in injection operations. The preferred choice is a unit consisting of two ball and seat check valves in series. Ball and seat valves will allow fluid flow when the pressure in annulus 14 rises to a preselected value in excess of the fluid pressure in the valve pocket 38. Spring loaded check valves may also be used. Such one-way valves and valve arrangements are well-known to those skilled in the art. The set point of the check valve will need to be selected so that the check valve will permit flow into the mandrel when there is a preselected differential pressure between the fluid in the annulus and the fluid in the mandrel.

The check valve 34 is connected to one end of the conduit on the exterior wall of the lower body section 46 at a point below the fluid port 66. Alternatively, at least a part of the conduit should be below the port 66. These arrangements will form a gas trap in the conduit 36, preventing produced fluids, such as corrosive gases, from entering the conduit and minimizing the chances of damage to the check valve 34.

Once the treating fluid has entered the valve pocket 38, it flows through ports 70 into a longitudinal bore 68 in the chemical injection valve 40. The longitudinal bore 68 houses one or more one-way or check valves 72 which allow the treating fluid to flow through an opening 73 in the end of the chemical injection valve 40 and into contact with the formation fluids. The check valves 72 may be of any of the types commonly used in injection operations and familiar to those skilled in the art. The preferred choice is again a ball and seat arrangement which may be used singly or in series plurality.

The injection valve 40 is inserted and removed from the valve housing 33 by standard wireline operations. The injection valve 40 is provided with a fishing neck 74 for attachment to a wireline and a locking assembly 76 which is used to secure chemical injection valve 40 in place in the valve housing 33. The fishing neck 74 and locking assembly 76 may be any one of the number of well known arrangements familiar to those skilled in the art. The locking assembly 76 is provided with dogs 78 which, when inserted into inner tube 52, rest on shoulders 80 thereof to secure the valve 40 in place in the valve housing 33.

Above and below ports 70, the chemical injection valve 40 is provided with fluid seals 82, which may comprise any of the number of well known fluid seals such as, for example, chevron seals or O-rings. As the chemical injection valve 40 is inserted into the valve pocket 38, fluid seals 82 contact shoulders 84 on the interior wall of the valve housing to form a fluid seal. This seal insures treating fluid will flow through the ports 70 and out of the chemical injection valve 40.

Deflector lugs 92 are provided on the exterior wall of lower body section 46 aligned with the check valve 34 to prevent the valve from contacting the casing 11 or any obstructions in the well 10 when the injection mandrel is run into the well. Similar deflector surfaces 93 are provided adjacent the upper and lower ends of the conduit.

The end of the lower body 46 has threads 94 for engaging a packer assembly 26 or for connection to tubing or other downhole tools (not shown) which may be attached to the center pocket mandrel 30.

Referring now to FIG. 1, 1A and 2, in the operation of the apparatus of FIG. 2, the center pocket mandrel 30 is inserted into a well 10 connected to the end of tubing string 20 and engaging the packer assembly 26. The check valve 34 is positioned above the packer assembly 26.

The chemical injection valve 40 may be in place when the mandrel is run into the well 10. Alternatively a wireline (not shown) may be attached to the fishing neck 74 and the chemical injection valve 40 lowered into the well through the tubing string 20.

The chemical injection valve 40 is then set in the valve housing using standard wireline methods. The chemical injection valve 40 is preferably constructed so that when dogs 78 are seated, the injection valve ports 70 will be adjacent the treating fluid port 66. Once the chemical injection valve 40 is in place and secured within the valve pocket 38, the wireline is removed in the usual manner.

The desired treating fluid is then introduced into the annulus 14 of the well. The fluid pressure in the annulus may then be increased until it is at the preselected value in excess of the fluid pressure in the valve pocket 38. The treating fluid from the annulus then flows through the check valve 34, the conduit 36 and the fluid port 66 into the valve pocket 38.

As the fluid pressure rises above the fluid pressure in the lower interval 23, the treating fluid in the valve pocket flows through the ports 70, the longitudinal bore 68 and the check valves 72 of the chemical injection valve 40 and into contact with the formation fluid. The check valves 72 in the chemical injection valve 40 prevent flow in the opposite direction.

Formation fluid from lower interval enters the center pocket mandrel 30 through the end 96 of the lower body 46 and contacts the treating fluid exiting the chemical injection valve 40. The treated formation fluid then flows upwardly through flow conduit 42 and the tubing string 20 to the surface for recovery.

A modification of the center pocket mandrel described above is illustrated in FIG. 3 and corresponds to the embodiment depicted in FIG. 1B. The center pocket mandrel **30*a* illustrated in FIG. 3 and the center pocket mandrel 30 illustrated in FIG. 2 are nearly identical in construction. The difference is the construction of the valve housings 38*a*. The operation of the center pocket mandrels 30*a* and 30** is also nearly identical. The following discussion will cover the differences between the two embodiments, and reference may be had to the prior discussion of the center pocket mandrel for other details.

Figure 3:
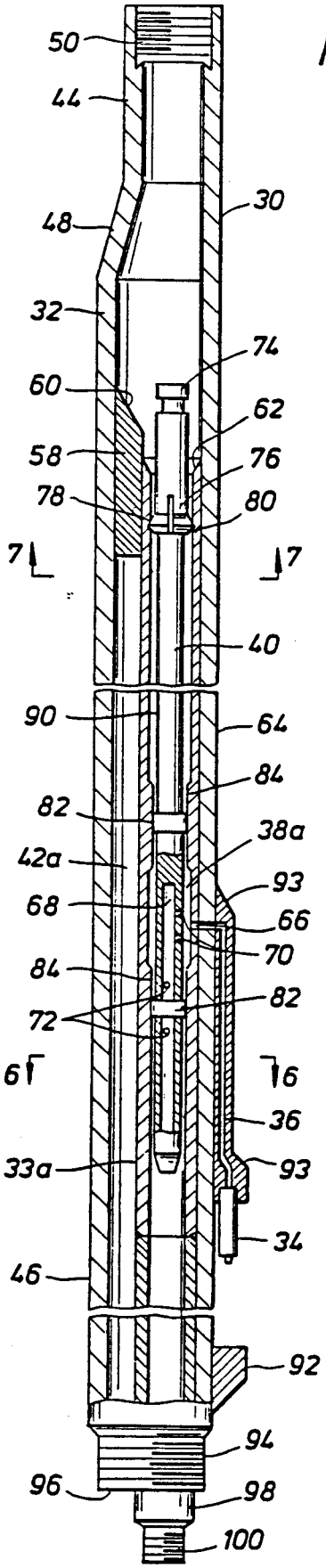
FIG. 3 is a longitudinal section of the first embodiment of the injection mandrel in accordance with the present invention, including a dip tube.

Referring to FIG. 3, the valve housing **33*a* is connected to dip tube 98 by threads, welding or any suitable means. The dip tube 98 is threaded 100 for connection to additional joints of dip tubing to extend the dip tube 98 to any preselected depth. This allows treating fluid to be injected directly into the lower interval 14 at any point below the packer assembly 26 (FIG. 1B) such as at the depth of the perforations in the producing zone 13**.

The treated formation fluid enters the flow conduit **42*a* of center pocket mandrel 30*a* through the opening 96 at the base of the lower body 46. Upon entering center pocket mandrel 30*a*, this fluid flows upwardly through flow conduit 42 and tubing string 20** to the surface for recovery.

Figure 4A:
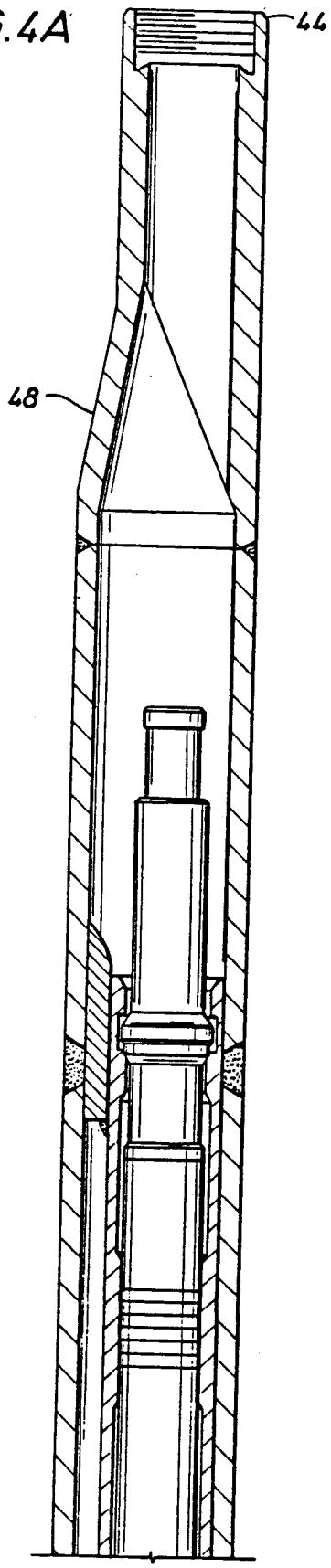
Figure 4B:
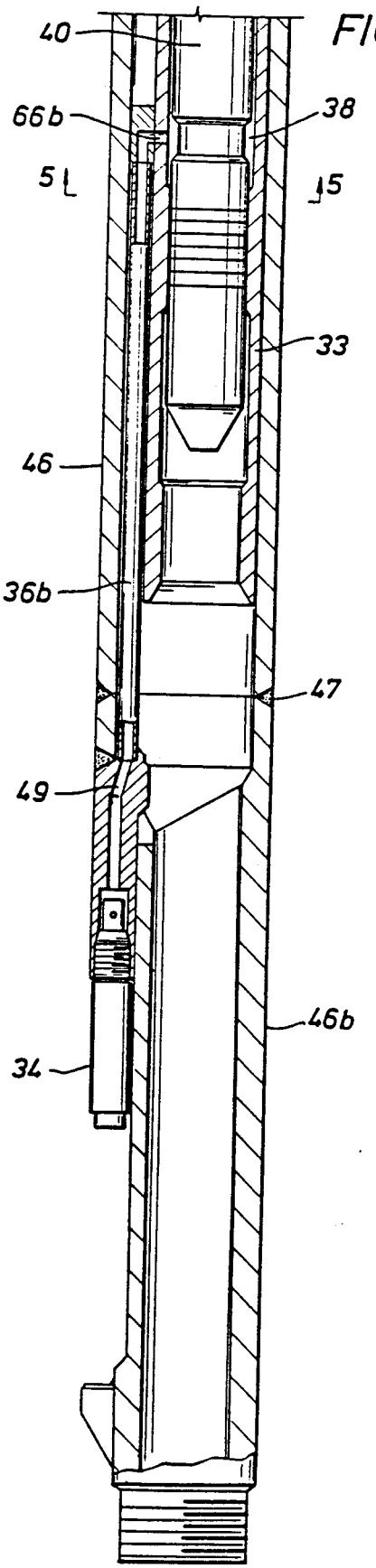

A second embodiment of a center pocket mandrel in accordance with the present invention is illustrated in FIG. 4. This embodiment is useful in operations where the diameter of the casing 11 (FIG. 1A) is such that a center pocket mandrel with a smaller outside diameter should be used.

Figure 6:
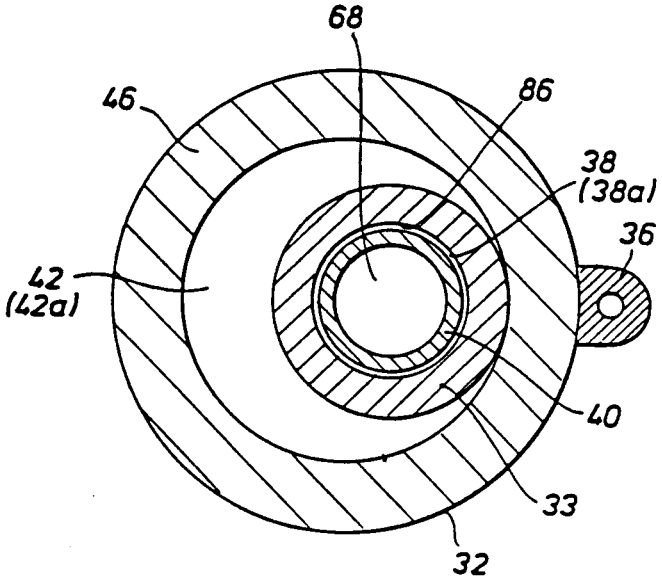
FIG. 6 is a horizontal sectional view of the first embodiment of the injection mandrel taken along line 6—6 of FIGS. 2 and 3.

The center pocket mandrel 30*b* in FIG. 4 and 7, and the center pocket mandrel in FIGS. 2 and 6 are nearly identical in construction except for the placement of their conduits 36 and 36*b*. The operation of the center pocket mandrels 30*b* and 30 is also essentially identical. The discussion below will therefore relate only the differences between the two embodiments, and reference may be had to the prior discussion for other construction and operation details.

The mandrel of this embodiment requires a special lower body section 46*b*. The lower body section is preferably attached to the mandrel housing 46 by welding 47. A port 49 is machined through the lower body to connect the conduit 36 and a check valve manifold 51. The manifold is threaded or otherwise adapted to accept a check valve 34.

Figure 5:
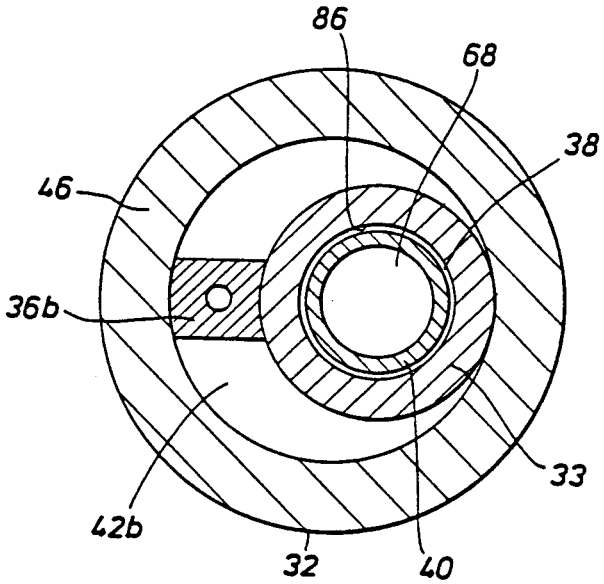
FIG. 5 is a horizontal section of the second embodiment of the injection mandrel taken along line 5—5 of FIG. 4B.

Referring to FIG. 4, conduit 36*b* is mounted inside the lower body section 46 between the outer surface of the valve housing 33 of the inside surface of the body 46. The check valve 34 is in fluid communication with the conduit and is mounted on the outer surface of the mandrel body 46. Referring to FIGS. 4 and 5, the conduit 36*b* extends through the flow conduit 42*b* and into the valve pocket 38 through the fluid port 66*b*. The rest of the details of this embodiment are the same as in the embodiment described above. By routing the treating fluid conduit through the inside of the mandrel, a smaller diameter mandrel is possible.

The mandrels of the present invention provide effective tools for injecting treating fluids into wells to treat fluids from producing formations. The ability to insert and remove chemical injection valves by standard wireline procedures allows the center pocket mandrel to be set at depths where side-pocket and other mandrels could not practically be used. Use of a dip tube allows the center pocket mandrel to be set at a selected depth while permitting injection of treating fluid into the well at any depth below the center pocket mandrel.

The exterior check valve (and the chemical injection valve) prevent formation fluid from entering the annulus of the well above the packer assembly. This is important to maintain the integrity of any subsurface safety valves in the tubing string and to minimize potential problems due to pressure leakage.

The center pocket mandrels of the present invention permit other downhole operations to be conducted below the mandrel by removing the chemical injection valve from the valve housing. A number of downhole tools such as well logging or perforating guns can be lowered through the valve pocket to conduct operations below the mandrel.

Many modifications and variations may be made in the techniques and structures described herein and depicted in the accompanying drawings without departing substantially from the concept of the present invention. In particular, it is recognized it is possible to modify a side pocket mandrel to include the check valve and certain other features of the invention and thereby practice the invention. Accordingly, it should be understood that the form of the invention described and illustrated herein is exemplary only, and is not intended as a limitation on the scope thereof.

We claim:

1. A center pocket injection mandrel for circulating treating fluid from a supply of such fluid in the annulus of a well through a separate chemical injection valve having a lower end and into a fluid produced from said well, comprising:

a body having a longitudinal flow conduit therethrough for the produced fluid and a port through the body communicating with the annulus of the well, and adapted to be attached to a tubing string;

a valve housing in the body in fluid communication with the flow conduit in the body and the port through the body, defining a valve pocket in the body adapted to receive a separate chemical injection valve; and a check valve connected to the body for permitting flow of the treating fluid from the annulus to the valve pocket through the port in the body and for preventing reverse flow, whereby when a chemical injection valve is in the valve pocket, treating fluid may be flowed through the check valve and the chemical injection valve into contact with the produced fluid and when there is no chemical injection valve in the pocket, the check valve prevents flow of produced fluids through the check valve into the annulus of the well.

* * * * *